United States Patent
Han et al.

(10) Patent No.: US 12,517,789 B2
(45) Date of Patent: Jan. 6, 2026

(54) ELECTRONIC DEVICE AND CONTROL METHOD

(71) Applicants: Hyundai Motor Company, Seoul (KR); Kia Corporation, Seoul (KR); Hyundai Autoever Corp., Seoul (KR)

(72) Inventors: Jang Soon Han, Seoul (KR); Bong Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 0 days.

(21) Appl. No.: 18/646,979

(22) Filed: Apr. 26, 2024

(65) Prior Publication Data
US 2025/0190310 A1 Jun. 12, 2025

(30) Foreign Application Priority Data
Dec. 12, 2023 (KR) .......................... 10-2023-0180169

(51) Int. Cl.
*G06F 11/14* (2006.01)
(52) U.S. Cl.
CPC .... *G06F 11/1433* (2013.01); *G06F 2201/865* (2013.01)

(58) Field of Classification Search
CPC ................................................... G06F 11/1433
See application file for complete search history.

(56) References Cited

U.S. PATENT DOCUMENTS

| | | | |
|---|---|---|---|
| 2013/0159733 A1* | 6/2013 | Lee ........................... | H04L 9/08 713/193 |
| 2015/0019800 A1* | 1/2015 | Ramirez ............. | G06F 11/1433 711/103 |
| 2016/0055113 A1* | 2/2016 | Hodge ................ | G06F 13/4027 710/308 |
| 2017/0010881 A1* | 1/2017 | Kawazu .................. | G06F 8/654 |
| 2021/0034355 A1* | 2/2021 | Montero ............... | G06F 3/0652 |
| 2021/0157563 A1* | 5/2021 | Duval ........................ | G06F 8/63 |
| 2022/0179960 A1* | 6/2022 | Spangler ............... | H04L 9/3239 |
| 2025/0117279 A1* | 4/2025 | Jun ..................... | G06F 11/0784 |

* cited by examiner

*Primary Examiner* — Robert W Beausoliel, Jr.
(74) *Attorney, Agent, or Firm* — SLATER MATSIL, LLP

(57) ABSTRACT

An electronic device can include a memory storing computer-executable instructions and at least one processor that accesses the memory and executes the instructions. The at least one processor can load target software among a plurality of pieces of software stored in a dedicated memory of a computing device into a shared memory of a hardware security module (HSM) for verifying software integrity, set a first sub-area for recovery of the target software in the shared memory, and recover the target software by use of the first sub-area, based on a fault occurring in the dedicated memory in which the target software is stored and/or the shared memory into which the target software is loaded.

18 Claims, 9 Drawing Sheets

ELECTRONIC DEVICE AND CONTROL METHOD

CROSS-REFERENCE TO RELATED APPLICATIONS

This application claims the benefit of priority to Korean Patent Application No. 10-2023-0180169, filed in the Korean Intellectual Property Office on Dec. 12, 2023, the entire contents of which are incorporated herein by reference.

TECHNICAL FIELD

The present disclosure relates to recovering software when a fault occurs.

BACKGROUND

Over-the-air (OTA) sourcing to which memory duplexing is applied is to locate a source code of real time software (RTSW) in different memory areas. When a source code of a first RTSW is operating in a first bank of a memory, a source code of a second RTSW received through the OTA may be located in a second bank of the memory. When the reception of the second RTSW is completed, a reset vector of the second RTSW may be changed to a main function start address to initialize a computing device.

An update of the RTSW through existing OTA sourcing use a method for duplexing the RTSW in a memory space divided in hardware in a computing device (e.g., a micro controller unit (MCU) or an application processor (AP)). In this case, when a fault occurs in all the duplexed memories in the computing device, it may be impossible to recover the memory.

SUMMARY

The present disclosure relates to an electronic device and a control method thereof, and more particularly, relates to technologies for implementing multiplexing of a software update using a swap of a multi-channel memory.

Some embodiments of the present disclosure can solve the above-mentioned problems occurring in the prior art while advantages achieved by the prior art are maintained intact. To address the above-mentioned problems, there is a need to develop a technology for backing up a computing device in common by providing a hardware security module, which is available in common to the computing device and includes a multi-core and a multi-communication channel, and a high-capacity shared memory.

An embodiment of the present disclosure can provide an electronic device for loading target software among a plurality of pieces of software stored in a dedicated memory of a computing device into a shared memory of a hardware security module for verifying the integrity of software to manage a memory using the hardware security module by use of a high-capacity shared memory at low cost and secure the stability of controllers with a minimum increase in unit price, and a control method thereof.

An embodiment of the present disclosure can provide an electronic device for setting a first sub-area for recovery of target software in a shared memory to backing up pieces of real time software (RTSW) of a micro controller unit (MCU) and an application processor (AP) in common, and a control method thereof.

An embodiment of the present disclosure can provides an electronic device for recovering target software by use of a first sub-area, based on that a fault occurs in at least one of a dedicated memory in which the target software is stored or a shared memory into which the target software is loaded, or any combination thereof, to securely downgrade software that is an update target to a previous version, although abnormality occurs in the software due to a memory fault and secure redundancy by use of software of the same version to improve the safety of the controller, and a control method thereof.

Technical problems to be solved by some embodiments of the present disclosure are not necessarily limited to the aforementioned problems, and solutions using an embodiment of the present disclosure to other technical problems not mentioned herein can be clearly understood from the following description by those skilled in the art to which the present disclosure pertains.

According to an embodiment of the present disclosure, an electronic device may include a memory storing computer-executable instructions and at least one processor that accesses the memory and executes the instructions. The at least one processor may load target software among a plurality of pieces of software stored in a dedicated memory of a computing device into a shared memory of a hardware security module (HSM) for verifying integrity of software, may set a first sub-area for recovery of the target software in the shared memory, and may recover the target software by use of the first sub-area, based on that a fault occurs in at least one of the dedicated memory in which the target software is stored or the shared memory into which the target software is loaded, or any combination thereof.

In an embodiment, the at least one processor may request the HSM to decrypt the target software loaded into the shared memory, based on that the fault occurs in the dedicated memory, and may store the target software loaded into the shared memory in the dedicated memory, based on that the target software loaded into the shared memory is decrypted by use of a seed key of a first encryption algorithm about encryption of the target software loaded into the shared memory, to recover the target software stored in the dedicated memory.

In an embodiment, the at least one processor may load the target software stored in the dedicated memory into the first sub-area, based on that the fault occurs in the shared memory, may identify a target address at which the target software is loaded into the shared memory, and may load the target software loaded into the first sub-area at the target address to recover the target software.

In an embodiment, the at least one processor may identify temporary software loaded into the first sub-area, at a time point preceding a time point when the fault occurs in the shared memory and may load the temporary software into the first sub-area from the dedicated memory, based on that the target software is recovered.

In an embodiment, the at least one processor may set a second sub-area, storing a message authentication code about integrity verification of software, in the shared memory and may store a message authentication code of the target software loaded into the shared memory in the second sub-area.

In an embodiment, the at least one processor may generate a first message authentication code of the target software loaded into the shared memory, at a first time point, may generate a second message authentication code of the target software loaded into the shared memory, at a second time point subsequent to the first time point, and may determine that the fault occurs in the shared memory, based on that the first message authentication code and the second message authentication code are different from each other.

In an embodiment, the at least one processor may identify a record of communication between a central communication unit for updating a plurality of pieces of software included in the computing device through over-the-air (OTA) sourcing and may determine whether the fault occurs in the dedicated memory, based on the record of communication.

In an embodiment, the at least one processor may identify a source code of the target software stored in the dedicated memory, based on the record of communication, may apply a predetermined key and the source code to a second encryption algorithm to obtain a first representative value of the source code, and may verify validity of the target software, based on a comparison between the first representative value and a second representative value of the target software loaded into a memory of the central communication unit.

In an embodiment, the at least one processor may load the target software loaded into the central communication unit into the dedicated memory, based on that the first representative value and the second representative value are different from each other, may generate a third message authentication code of the target software stored in the dedicated memory, at a first time point, may generate a fourth message authentication code of the target software stored in the dedicated memory, at a fourth time point subsequent to the third time point, and may determine that the fault occurs in the dedicated memory, based on that the third message authentication code and the fourth message authentication code are different from each other.

In an embodiment, the at least one processor may identify a code flash area set in the dedicated memory, may determine that the fault occurs in the code flash area, based on that the target software is loaded into the code flash area, and may load a reduced version of the target software identified from the central communication unit into the code flash area, based on that the fault occurs in the code flash area.

According to an embodiment of the present disclosure, a control method may include loading target software among a plurality of pieces of software stored in a dedicated memory of a computing device into a shared memory of a hardware security module (HSM) for verifying integrity of software, setting a first sub-area for recovery of the target software in the shared memory, and recover the target software by use of the first sub-area, based on that a fault occurs in at least one of the dedicated memory in which the target software is stored or the shared memory into which the target software is loaded, or any combination thereof.

In an embodiment, the recovering of the target software may include requesting the HSM to decrypt the target software loaded into the shared memory, based on that the fault occurs in the dedicated memory, and storing the target software loaded into the shared memory in the dedicated memory, based on that the target software loaded into the shared memory is decrypted by use of a seed key of a first encryption algorithm about encryption of the target software loaded into the shared memory, to recover the target software stored in the dedicated memory.

In an embodiment, the recovering of the target software may include loading the target software stored in the dedicated memory into the first sub-area, based on that the fault occurs in the shared memory, identifying a target address at which the target software is loaded into the shared memory, and loading the target software loaded into the first sub-area at the target address to recover the target software.

In an embodiment, the recovering of the target software may include identifying temporary software loaded into the first sub-area, at a time point preceding a time point when the fault occurs in the shared memory and loading the temporary software into the first sub-area from the dedicated memory, based on that the target software is recovered.

In an embodiment, the control method may further include setting a second sub-area, storing a message authentication code about integrity verification of software, in the shared memory and storing a message authentication code of the target software loaded into the shared memory in the second sub-area.

In an embodiment, the control method may further include generating a first message authentication code of the target software loaded into the shared memory, at a first time point, generating a second message authentication code of the target software loaded into the shared memory, at a second time point subsequent to the first time point, and determining that the fault occurs in the shared memory, based on that the first message authentication code and the second message authentication code are different from each other.

In an embodiment, the control method may further include identifying a record of communication between a central communication unit for updating a plurality of pieces of software included in the computing device through over-the-air (OTA) and in the computing device, and determining whether the fault occurs in the dedicated memory, based on the record of communication.

In an embodiment, the determining of whether the fault occurs in the dedicated memory may include identifying a source code of the target software stored in the dedicated memory, based on the record of communication, apply a predetermined key and the source code to a second encryption algorithm to obtain a first representative value of the source code, and verifying validity of the target software, based on a comparison between the first representative value and a second representative value of the target software loaded into a memory of the central communication unit.

In an embodiment, the determining of whether the fault occurs in the dedicated memory may include loading the target software loaded into the central communication unit into the dedicated memory, based on that the first representative value and the second representative value are different from each other, generating a third message authentication code of the target software stored in the dedicated memory, at a third time point, generating a fourth message authentication code of the target software stored in the dedicated memory, at a fourth time point subsequent to the third time point, and determining that the fault occurs in the dedicated memory, based on that the third message authentication code and the fourth message authentication code are different from each other.

In an embodiment, the control method may further include identifying a code flash area set in the dedicated memory, determining that the fault occurs in the code flash area, based on that the target software is loaded into the code flash area, and loading a reduced version of the target software identified from the central communication unit into the code flash area, based on that the fault occurs in the code flash area.

BRIEF DESCRIPTION OF THE DRAWINGS

The above and other features and advantages of the present disclosure can be more apparent from the following detailed description taken in conjunction with the accompanying drawings, in which.

Figure 1:
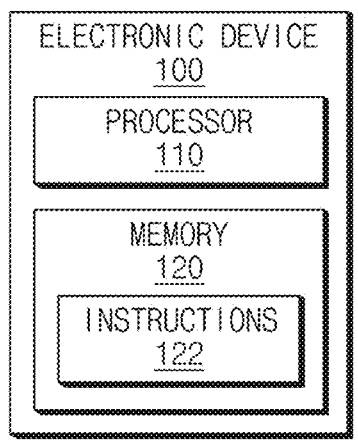
FIG. 1 is a drawing illustrating an electronic device according to an embodiment of the present disclosure.

With regard to description of drawings, same or similar denotations may be used for same or similar components.

DETAILED DESCRIPTION OF ILLUSTRATIVE EMBODIMENTS

Hereinafter, some embodiments of the present disclosure will be described in detail with reference to the example drawings. In adding the reference numerals to the components of each drawing, it can be noted that identical components can be designated by identical numerals even when they are displayed on other drawings. In addition, a detailed description of well-known features or functions can be omitted to not unnecessarily obscure the gist of the present disclosure. Hereinafter, various example embodiments of the present disclosure may be described with reference to the accompanying drawings. However, it can be understood that the various example embodiments are not intended to necessarily limit the present disclosure to specific implementation forms and can include various modifications, equivalents, and/or alternatives of embodiments of the present disclosure. With regard to description of drawings, similar components may be marked by similar reference numerals.

Unless otherwise defined, terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art. For example, the terms, such as "first", "second", "1st", "2nd", or the like, used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It can be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it can be understood that there is no intervening component (e.g., a third component).

According to the situation, the expression "configured to" used in the present disclosure may be used interchangeably with, for example, the expression "suitable for", "having the capacity to", "designed to", "adapted to", "made to", or "capable of".

The term "configured to" must not mean only "specifically designed to" in hardware. Instead, the expression "a device configured to" can mean that the device is "capable of" operating together with another device or other parts. For example, a "processor configured to perform A, B, and C" can mean a generic-purpose processor (e.g., a central processing unit (CPU) or an application processor) that may perform corresponding operations by executing one or more software programs that store a dedicated processor (e.g., an embedded processor) for performing a corresponding operation or a memory device. Terms of a singular form may include plural forms unless the context clearly indicates otherwise.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", "at least one of A, B, C, or any combination thereof", and "at least one of A, B, or C, or any combination thereof" may include any one of, at least one of each item listed, or all possible combinations of the items enumerated together in a corresponding one of the phrases. Particularly, the phrase such as "at least one of A, B, C, or any combination thereof" may include "A", "B", or "C", or "AB" or "ABC", which is a combination thereof.

Hereinafter, some example embodiments of the present disclosure will be described in detail with reference to FIGS. 1 to 9.

FIG. 1 is a drawing illustrating an electronic device according to an embodiment of the present disclosure.

An electronic device 100 according to an embodiment may include a processor 110 and a memory 120 including instructions 122, any combination of or all of which may be in plural or may include plural components thereof. The electronic device 100 may indicate a device that recovers software by use of a hardware security module (HSM), when a memory fault occurs in a process of updating pieces of software stored in a computing device.

The electronic device 100 may load software stored in a dedicated memory of the computing device into a shared memory of the HSM. The electronic device 100 may identify an update of pieces of software stored in the computing device, based on that the above-mentioned software is loaded into the shared memory. The update of the pieces of software stored in the computing device may be performed through over-the-air (OTA) sourcing, but is not necessarily limited thereto.

When a fault occurs in the dedicated memory of the computing device in the process of updating the computing device through the OTA, the electronic device 100 may recover software by use of a sub-area of the HSM. For example, the electronic device 100 may load software loaded into the shared memory into the dedicated memory in which the fault occurs. The electronic device 100 may load the software loaded into the shared memory into the dedicated memory in which the fault occurs, thus recovering the software. A detailed description associated with it will be described below with reference to FIGS. 4 to 5. For reference, the case in which the fault occurs in a memory may include an error and/or a failure that occur(s) in a process of updating software stored in the memory. Furthermore, the case in which the fault occurs in the memory may include a physical fault of the memory.

The computing device may include a micro controller unit (MCU) and an application processor (AP), a combination of which or either of which may be in plural or may include plural components thereof. Furthermore, the computing device may include one or more MCUs as applications or may be operatively connected with the one or more MCUs. Therefore, for convenience of description in the specification, it may be mainly described that the MCU is a first computing device and the AP is a second computing device.

The first computing device and the second computing device may be included in one IC package and may be separately configured to be included different IC packages, respectively. The first computing device may be included in an IC package of the second computing device to be configured as one IC package.

The first computing device may be a processor configured to perform a specified operation. For example, the first computing device may perform an operation for providing a vehicle with a specified function, by use of one or more pieces of software. The second computing device may run an operating system or an application program (or an application) and may control hardware or software components connected with the second computing device. For example, the second computing device may be implemented as a system on chip (SoC).

The first computing device or the second computing device may load a command or data received from a non-volatile memory connected thereto into a volatile memory to process the command or the data. For example, the first computing device or the second computing device may include a dedicated memory connected thereto. The dedicated memory can be in plural or can include plural components thereof. The dedicated memory may indicate a memory into which one computing device is able to store and load a command or data alone. Otherwise, the shared memory may indicate a memory in which pieces of software stored in the dedicated memory are able to be stored together. In detail, the shared memory may store pieces of software stored in the dedicated memory of the first computing device and pieces of software stored in the dedicated memory of the second computing device.

Software capable of being stored in each of the dedicated memories of the first computing device and the second computing device may include real time software (RTSW). The RTSW may indicate software in which functions (e.g., a communication function, an input function, an output function, and a determination function) of the computing device are included in a determined form (e.g., in the form of a source code). In other words, the RTSW may be software that performs main functions of the computing device. Such RTSW may be updated through the OTA. Furthermore, the RTSW may be loaded into the shared memory by the electronic device 100. Hereinafter, for convenience of description in the specification, software that will be described below is mainly described as the RTSW, for example.

The HSM may indicate a physical computing device that protects and manages a digital key and encrypts and decrypts pieces of loaded software. For example, the HSM may include a shared memory. The HSM may encrypt and decrypt pieces of software loaded into the shared memory. In detail, when the software stored in the dedicated memory of the computing device is loaded into the shared memory, the HSM may encrypt the software. When the software loaded into the shared memory is loaded into the dedicated memory, the HSM may decrypt the software.

An encryption scheme used in the HSM may include, for example, a data encryption standard (DES) scheme, a triple DES (TDES) scheme, an advanced encryption standard (AES) encryption scheme, a SEED algorithm, a Rivest Shamir Adleman (RSA) scheme, or an academy-research institute-agency (ARIA) algorithm, for example. In detail, the DES scheme may be an encryption and decryption scheme using a symmetric key encryption algorithm which uses a 56-bit key, for example. The TDES scheme may be a scheme that uses DES three times repeatedly, for example. The AES scheme may be a scheme that encrypts and decrypts a block of a 128-bit size using all keys, each of which has a bit length in multiples of 32, of 128 bits or more, such as 128 bits, 160 bits, 192 bits, 224 bits, and 256 bits, for example. The ARIA algorithm may be a block encryption scheme that encrypts and decrypts a 128-bit block using a 128-, 192-, or 256-bit key, for example.

Similar to the AES, the SEED scheme may be a 128-bit block encryption scheme that performs encryption and decryption using 128 bits or 256 bits of the encryption key, for example. For example, the SEED scheme may indicate a scheme that divides a 128-bit plaintext block into two pieces of upper and lower 64-bit data and may perform 16 rounds using 16 64-bit round keys to finally output a 128-bit ciphertext block. In detail, the HSM may divide and store a 128-bit plaintext block into right 64 bits and left 64 bits, for example. The HSM may apply a round key to an encryption function to encrypt the right 64 bits and may exclusive OR (XOR) the result value and the left 64 bits to input the XORed value to a new round. The HSM may repeat 16 rounds in such a manner and may output a 128-bit ciphertext block after the 16 rounds are ended.

The processor 110 may execute software and may control at least one other component (e.g., a hardware or software component) connected with the processor 110. In addition, the processor 110 may perform a variety of data processing or calculation. For example, the processor 110 may store target software in the memory 120.

For reference, the processor 110 may perform all operations performed by the electronic device 100. Therefore, for convenience of description in the specification, the operation performed by the electronic device 100 is mainly described as an operation performed by the processor 110, for example. Furthermore, for convenience of description in the specification, the processor 110 is mainly described as, but not limited to, one processor. For example, the electronic device 100 may include at least one processor. Each of the at least one processor may perform all operations associated with an operation of recovering software.

The memory 120 may temporarily and/or permanently store various pieces of data and/or information required to perform the operation of recovering software. For example, the memory 120 may store the target software. For reference, the memory 120 may indicate a memory different from the dedicated memory of the first computing device, the dedicated memory of the second computing device, the shared memory of the HSM, or any combination thereof.

A communication device (not shown) may assist in performing communication between the electronic device 100 and external electronic devices. For example, the communication device may include one or more components for performing communication between the electronic device 100 and the external electronic devices. For example, the communication device may include a short range wireless communication unit, a microphone, or the like. A short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like, for example.

Figure 2:
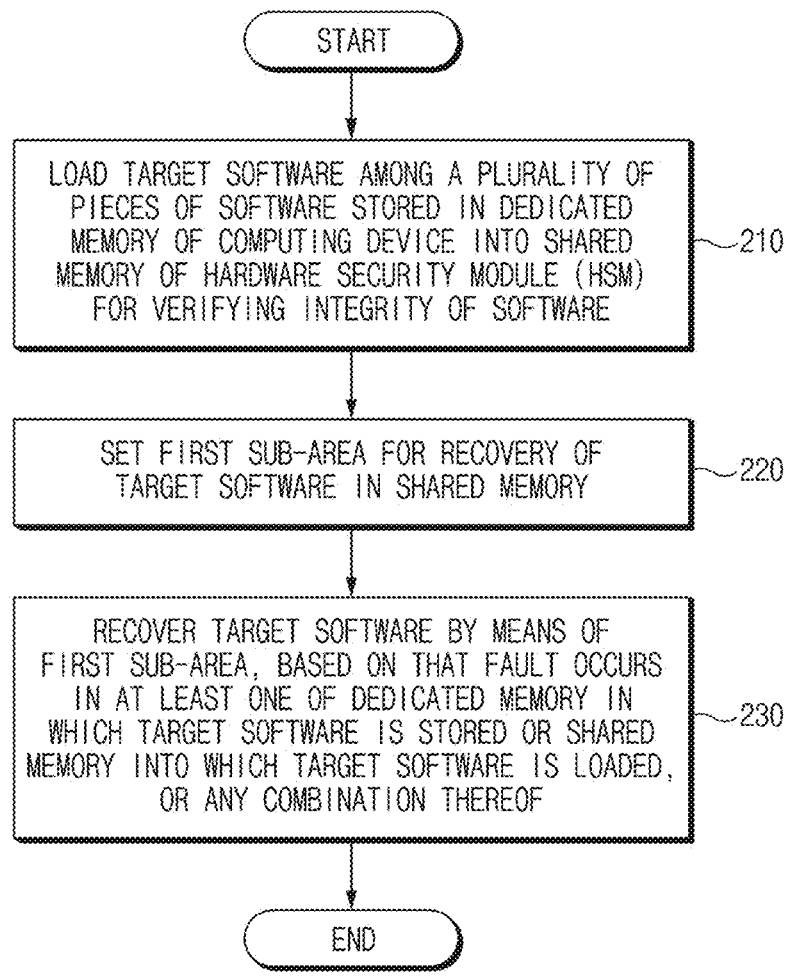
FIG. 2 is a flowchart for describing a control method according to an embodiment of the present disclosure.

FIG. 2 is a flowchart for describing a control method according to an embodiment of the present disclosure.

In operation 210, an electronic device (e.g., an electronic device 100 of FIG. 1) according to an embodiment may load target software among a plurality of pieces of software stored in a dedicated memory of a computing device into a shared memory of a hardware security module (HSM) for verifying the integrity of software. For example, the target software may indicate software stored in a dedicated memory of at least one of a first computing device or a second computing device. Particularly, the target software may include software that is scheduled to be updated through OTA. Therefore, the electronic device may load the target software into the shared memory to prepare for a memory fault due to an update through the OTA.

In operation 220, the electronic device may set a first sub-area for recovery of the target software in the shared memory. For example, the first sub-area may indicate a recovery memory. The recovery memory may store the target software. In detail, when a fault occurs in the dedicated memory and/or when the fault occurs in the shared memory, the electronic device may store the target software in the recovery memory. A detailed description associated with it will be described below with reference to FIGS. 4 to 6.

In operation 230, the electronic device may recover the target software by use of the first sub-area, based on that the fault occurs in at least one of the dedicated memory in which the target software is stored or the shared memory into which the target software is loaded, or any combination thereof. For example, when the fault occurs in a memory, it may occur in each of the dedicated memories in which the target software is stored and the shared memory into which the target software is loaded. In detail, when the fault occurs in the dedicated memory, the electronic device may store the target software loaded into the shared memory in the recovery memory. After the fault that occurs in the dedicated memory is resolved by the first computing device, the electronic device may load the target software stored in the first sub-area into the dedicated memory of the first computing device. The electronic device may perform the above-mentioned operations to recover the target software. A detailed description associated with it will be described below with reference to FIGS. 4 to 6.

Figure 3:
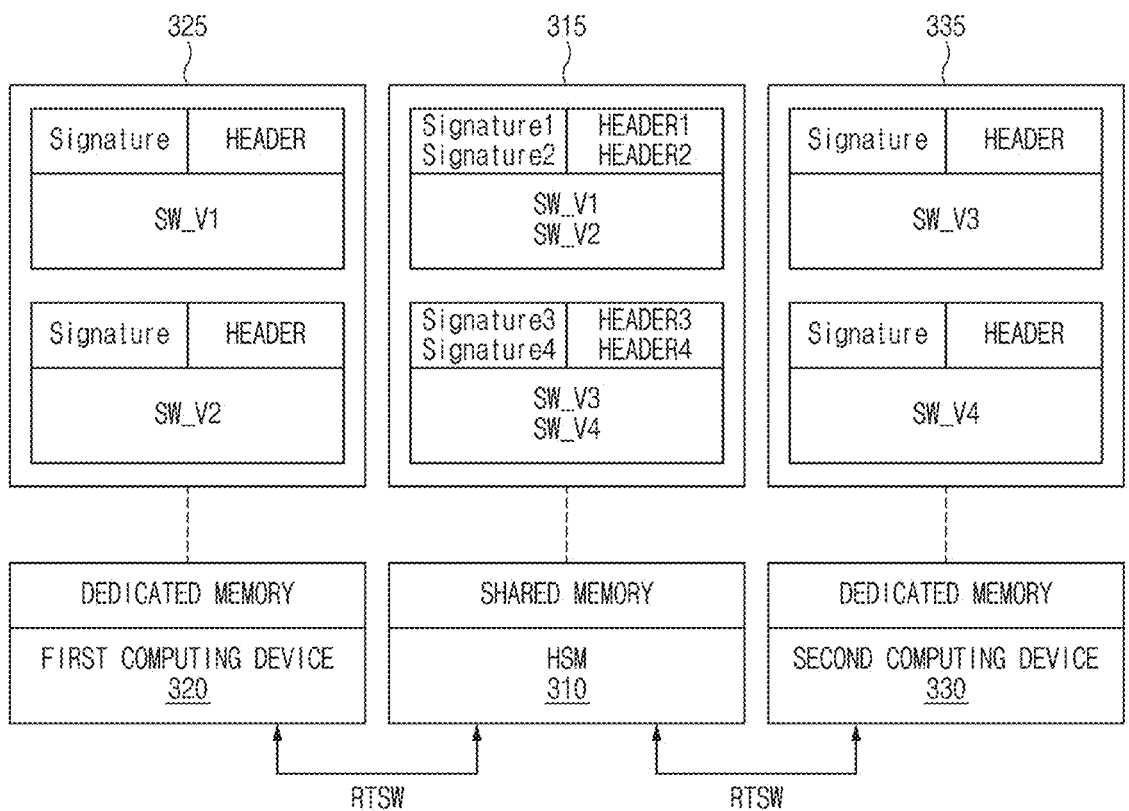
FIG. 3 is a drawing illustrating a connection relationship between a computing device and a hardware security module (HSM), in an electronic device according to an embodiment of the present disclosure.

FIG. 3 is a drawing illustrating a connection relationship between a computing device and a hardware security module (HSM), in an electronic device according to an embodiment of the present disclosure.

An electronic device (e.g., an electronic device 100 of FIG. 1) according to an embodiment may identify an HSM 310, a first computing device 320, and a second computing device 330. For example, the electronic device may identify a shared memory 315 of the HSM 310. The electronic device may identify a dedicated memory 325 of the first computing device 320 and/or a dedicated memory 335 of the second computing device 330.

The HSM 310 may transmit and receive software with each of the first computing device 320 and the second computing device 330. For example, the HSM 310 may receive pieces of software (e.g., SW_V1 and SW_V2 in FIG. 3) stored in the dedicated memory 325 of the first computing device 320. The pieces of software stored in the dedicated memory 325 of the first computing device 320 may be loaded into the shared memory 315 by the electronic device or the HSM 310. Similarly, the HSM 310 may receive pieces of software (e.g., SW_V3 and SW_V4 in FIG. 3) stored in the dedicated memory 335 of the second computing device 330. The pieces of software stored in the dedicated memory 335 of the second computing device 330 may be loaded into the shared memory 315 by the electronic device or the HSM 310.

The first computing device 320 may respectively store the pieces of software in divided areas included in the dedicated memory 325. For example, the first computing device 320 may store the software (e.g., SW_V1) in bank A of the dedicated memory 325 and may store the software (e.g., SW_V2) in bank B of the dedicated memory 325. For reference, the software (e.g., SW_V1) may indicate a previous version of the software (e.g., SW_V2). When the reception of the software (e.g., SW_V2) is completed, the first computing device 320 may set a reset vector as a start address of a main function of the software (e.g., SW_V2).

When the reset vector is set, the electronic device may initialize the first computing device 320. Such an operation is not limited to the first computing device 320, and may also be applied to the second computing device 330 in the same manner.

For reference, when at least one of the first computing device 320 or the second computing device 330 uses Classic Automotive Open System Architecture, the computing device to which the Classic Automotive Open System Architecture is applied may receive software using a DCM module. Otherwise, when at least one of the first computing device 320 or the second computing device 330 uses Adaptive AUTOSAR (adaptive automotive open system architecture), the computing device to which the Adaptive AUTOSAR is applied may receive software using a diagnosis over Internet protocol (DoIP) module or an EtherDiag module.

The electronic device may verify the integrity of the pieces of software loaded into the shared memory 315. For example, the electronic device may determine a memory fault through the integrity verification of the pieces of software loaded into the shared memory 315. The integrity verification of the software may include a method for comparing a value obtained by encrypting a hash value recorded in a header of the software using a predetermined key with a signature of the software.

Each of the first computing device 320 and the second computing device 330 may back up the pieces of software (e.g., the pieces of software stored in each of the first computing device 320 and the second computing device 330) to the shared memory 315. Furthermore, the electronic device may back up the pieces of software to the shared memory 315 of the HSM 310 available in common to the first computing device 320 and the second computing device 330 and including a multi-core and a multi-communication channel, thus resolving a memory fault.

Figure 4:
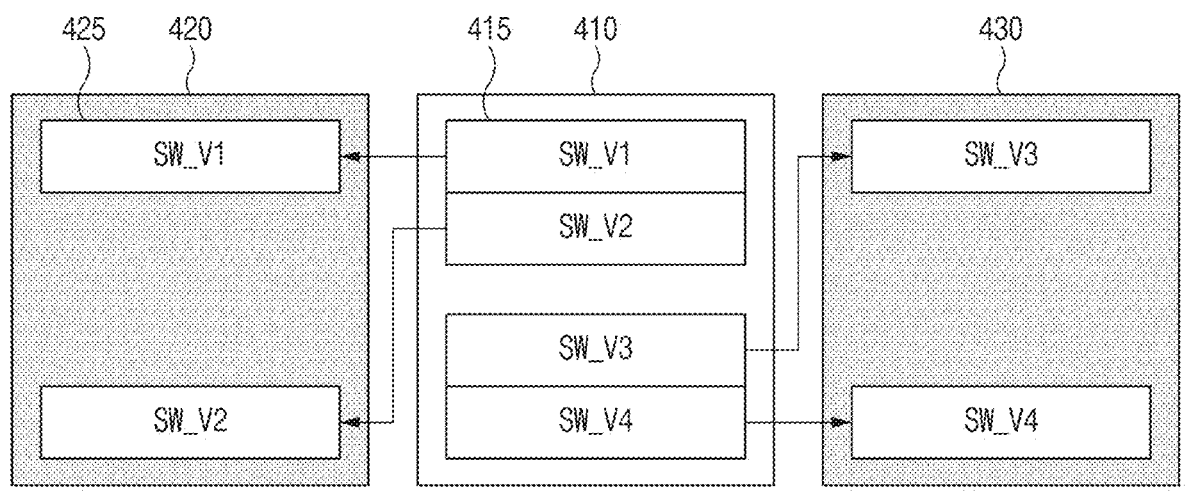
FIG. 4 is a drawing illustrating a method for recovering target software, based on that a fault occurs in a dedicated memory, in an electronic device according to an embodiment of the present disclosure.

FIG. 4 is a drawing illustrating a method for recovering target software, based on that a fault occurs in a dedicated memory, in an electronic device according to an embodiment of the present disclosure.

An electronic device (e.g., an electronic device 100 of FIG. 1) according to an embodiment may recover first target software 425, based on that a fault occurs in a dedicated memory 420 of a first computing device. In detail, the electronic device may request a hardware security module (HSM) to decrypt the second target software 415 loaded into a shared memory 410, based on that the fault occurs in the dedicated memory 420 of the first computing device.

For reference, referring to FIG. 4, the first target software 425 may indicate software stored in the memory (e.g., the dedicated memory 420 of the first computing device) in which the fault occurs. The second target software 415 may indicate software which performs the same function as the first target software 425, but is stored a memory (e.g., the shared memory 410) different from the memory in which the first target software 425 is stored.

The electronic device may store the second target software 415 loaded into the shared memory 410 in the dedicated memory 420 of the first computing device, based on that the second target software 415 is decrypted by use of a seed key of a first encryption algorithm about encryption of the second target software 415 loaded into the shared memory 410. The seed key may indicate a key capable of being used for encryption and/or decryption of software.

The electronic device may store the second target software 415 loaded into the shared memory 410 in the dedicated memory 420 of the first computing device, thus recovering the first target software 425. For reference, the first encryption algorithm may include, but is not limited to, at least one of a DES scheme, a TDES scheme, an AES encryption scheme, a SEED scheme, an RSA scheme, or an ARIA scheme, for example. Furthermore, the operations described with reference to FIG. 4 may also be applied to a dedicated memory 430 of a second computing device in a same manner.

Figure 5:
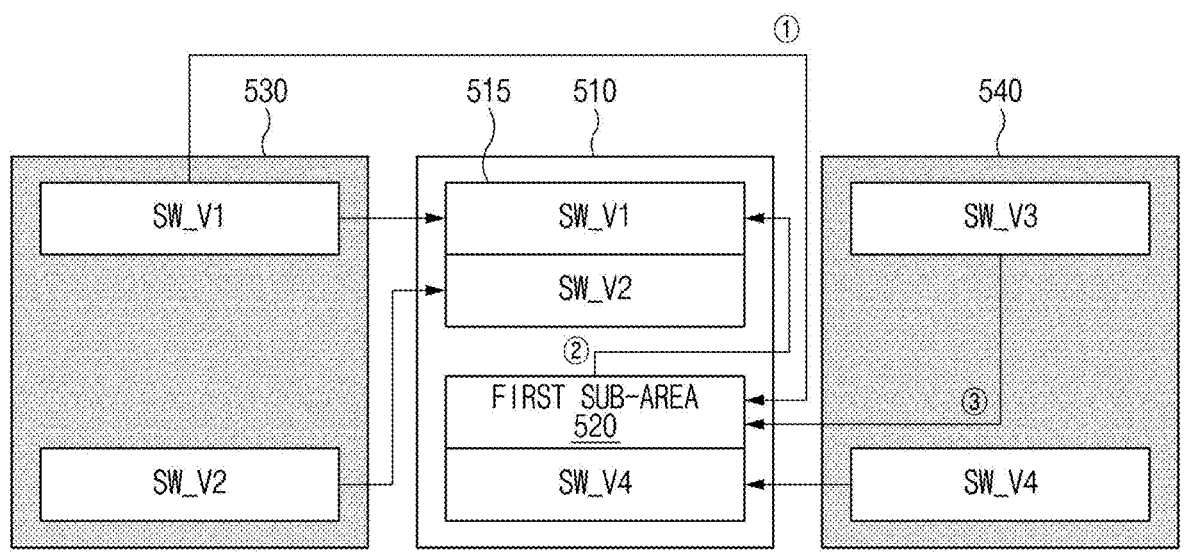
FIG. 5 is a drawing illustrating a method for recovering target software, based on that a fault occurs in a shared memory, in an electronic device according to an embodiment of the present disclosure.

FIG. 5 is a drawing illustrating a method for recovering target software, based on that a fault occurs in a shared memory, in an electronic device according to an embodiment of the present disclosure.

An electronic device (e.g., an electronic device 100 of FIG. 1) according to an embodiment may recover first target software 515, based on that a fault occurs in a shared memory 510. For example, the electronic device may identify that the fault occurs in the shared memory 510, by use of a message authentication code (MAC) value of each of pieces of software stored in the shared memory 510. In detail, the electronic device may obtain the MAC value of each of the pieces of software stored in the shared memory 510. The electronic device may compare MAC values of each of the pieces of software stored in the shared memory 510 at a set or predetermined time interval, thus identifying that the fault occurs in the shared memory 510. A detailed description about the operation of obtaining the MAC value and the operation of comparing the MAC values will be given below with reference to FIG. 6.

For reference, referring to FIG. 5, the first target software 515 may indicate software stored in the memory (e.g., the shared memory 510) in which the fault occurs. A second target software may indicate software which performs the same function as the first target software 515, but is stored in a memory (e.g., a dedicated memory 530 of a first computing device) different from the memory in which the first target software 515 is stored.

The electronic device may load the second target software stored in the dedicated memory 530 into a first sub-area 520, based on that the fault occurs in the shared memory 510. Thereafter, the electronic device may identify a target address at which the first target software 515 is loaded into the shared memory 510.

The electronic device may load the second target software loaded into the first sub-area 520 at the above-mentioned target address, thus recovering the first target software 515. Thereafter, the electronic device may perform operations that will be described below, based on that the first target software 515 is recovered. For example, the electronic device may identify temporary software (e.g., SW_V3) loaded into the first sub-area 520, at a time point preceding the time point when the fault occurs in the shared memory 510. The electronic device may load the temporary software into the first sub-area 520 from a dedicated memory 540 of a second computing device, based on the first target software 515 is recovered. Although the first computing device and the second computing device are changed, such operations may be applied in a same manner.

Figure 6:
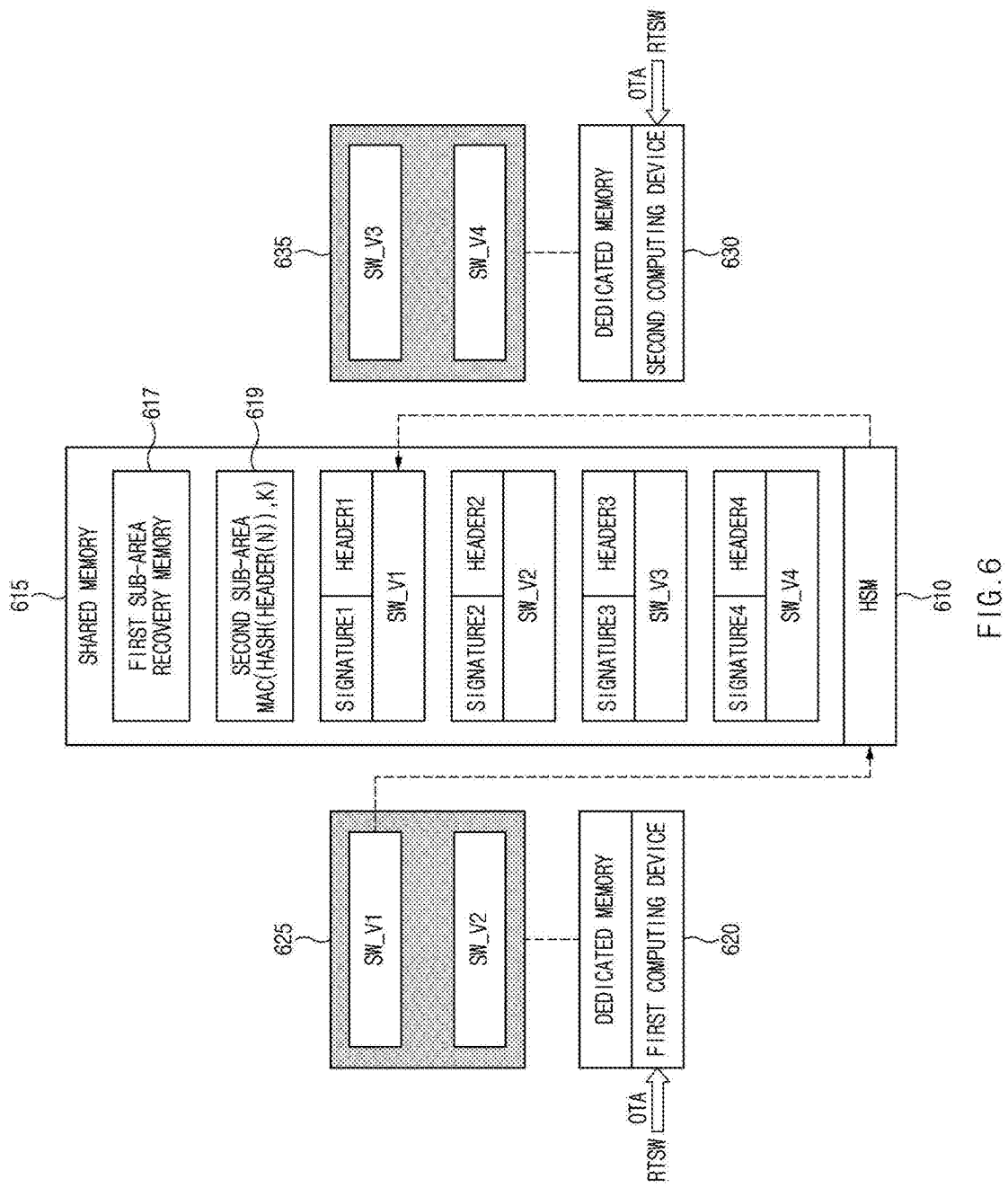
FIG. 6 is a drawing illustrating a detailed connection relationship between a computing device and a hardware security module (HSM), in an electronic device according to an embodiment of the present disclosure.

FIG. 6 is a drawing illustrating a detailed connection relationship between a computing device and a hardware security module (HSM), in an electronic device according to an embodiment of the present disclosure.

An electronic device (e.g., an electronic device 100 of FIG. 1) according to an embodiment may identify an HSM 610, a first computing device 620, and a second computing device 630. For example, the electronic device may identify a shared memory 615 of the HSM 610. The electronic device may identify a dedicated memory 625 of a first computing device 620 and/or a dedicated memory 635 of a second computing device 630.

The HSM 610 may set a first sub-area 617 and a second sub-area 619 in the shared memory 615. In detail, the first sub-area 617 may indicate a recovery memory for recovery of software, and the second sub-area 619 may indicate a memory which stores a message authentication code about integrity verification of software.

The electronic device may store a message authentication code of target software loaded into the shared memory 615 in the second sub-area 619. For example, the message authentication code may be used to provide integrity of data. The integrity may indicate identifying that received data or stored data has the identity of original data, when the data is transmitted or stored. The method for generating the message authentication code may include a message authentication code generation method using a block cipher, for example HMAC and CMAC using a keyed hash function.

The electronic device may generate a first message authentication code of the target software (e.g., SW_V1) loaded into the shared memory 615, at a first time point. Thereafter, the electronic device may generate a second message authentication code of the target software (e.g., SW_V1) loaded into the shared memory 615, at a second time point subsequent to the first time point.

The electronic device may verify the integrity of the shared memory 615 through a comparison between the first message authentication code and the second message authentication code. In detail, the electronic device may determine that the integrity of the target software is not verified, based on that the first message authentication code and the second message authentication code are different from each other.

The electronic device may determine that a fault occurs in the shared memory 615, based on that the integrity of the target software loaded in the shared memory 615 is not verified. Such an operation is not limited to only the shared memory 615, which may be applied to the dedicated memory 625 of the first computing device 620, or the dedicated memory 635 of the second computing device 630, or any combination thereof.

Figure 7:
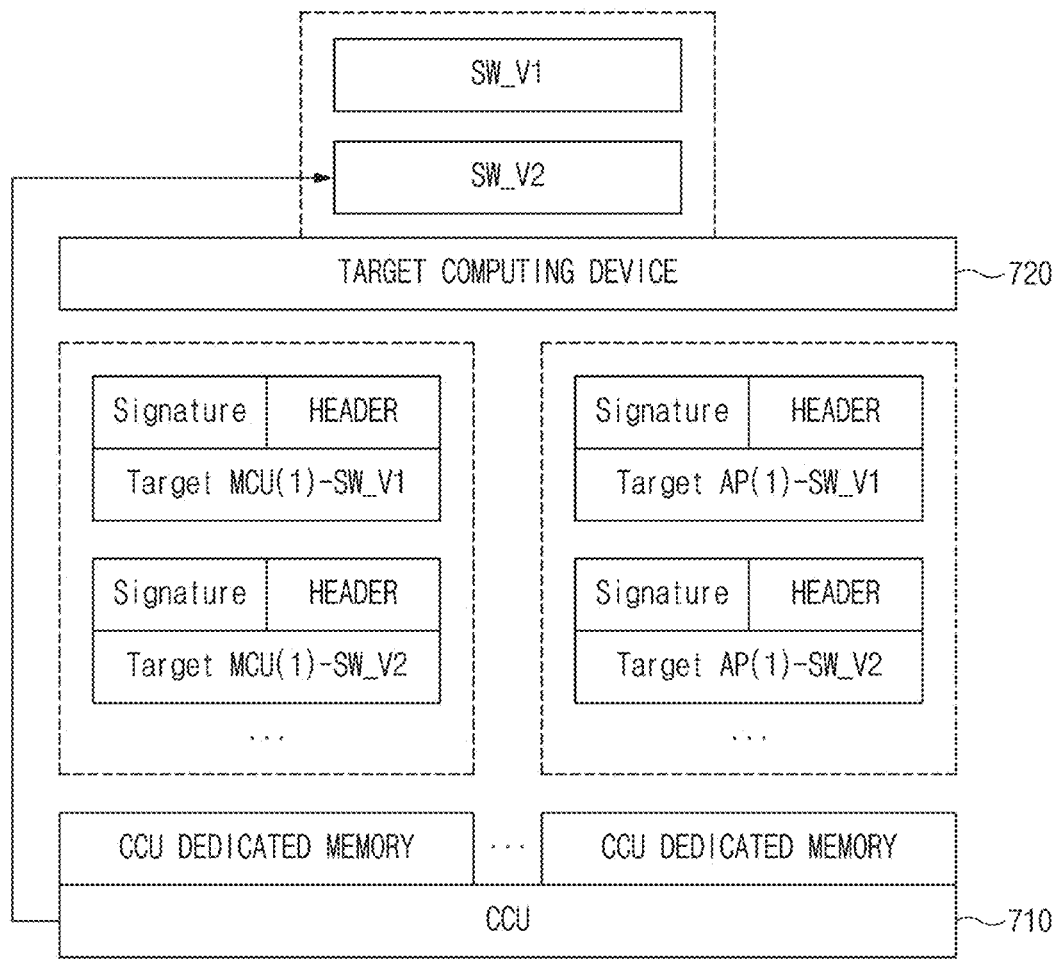
FIG. 7 is a drawing illustrating a method for determining whether a fault occurs in a dedicated memory, by use of a record of communication between a central communication unit (CCU) and a target computing device, in an electronic device according to an embodiment of the present disclosure.

FIG. 7 is a drawing illustrating a method for determining whether a fault occurs in a dedicated memory, by use of a record of communication between a central communication unit (CCU) and a target computing device, in an electronic device according to an embodiment of the present disclosure.

An electronic device (e.g., an electronic device 100 of FIG. 1) according to an embodiment may identify a CCU 710 and a target computing device 720. For example, the CCU 710 may indicate a device that routes a message to perform communication between computing devices that are in different channels and computing devices that use different communication protocols. The target computing device 720 may indicate a computing device that performs communication with the CCU 710 between a first computing device and a second computing device.

Although a fault associated with hardware occurs in a memory of the CCU 710 or the target computing device 720, the electronic device may secure redundancy capable of ensuring a normal operation of the target computing device 720.

The CCU 710 may include pieces of software with the latest version. The electronic device may identify a record of communication between the CCU 710, which performs an update of a plurality of pieces of software included in the target computing device 720 through over-the-air (OTA), and the target computing device 720. The electronic device may determine whether a fault occurs in the memory of the target computing device 720, based on the record of communication.

In detail, the electronic device may determine whether the fault occurs in the memory of the target computing device 720 by use of verification for a code of software to be updated (hereinafter referred to as "target software"). Such verification may be performed by the electronic device. For example, the electronic device may identify a source code of the target software stored in a dedicated memory, based on the record of communication. The electronic device may apply a predetermined key and the source code to a second encryption algorithm to obtain a first representative value of the source code. For reference, the second encryption algorithm may include, but is not limited to, at least one of a DES scheme, a TDES scheme, an AES encryption scheme, a SEED scheme, an RSA scheme, or an ARIA scheme, for example.

The electronic device may verify the validity of the target software, based on a comparison between the first representative value and a second representative value of the target software loaded into the memory of the CCU 710. The electronic device may determine that the fault occurs in a dedicated memory of the target computing device 720, based on that the first representative value and the second representative value are different from each other.

The electronic device may load the target software loaded into the CCU 710 into the dedicated memory of the target computing device 720, based on that the fault occurs in the dedicated memory of the target computing device 720. The electronic device may generate a third message authentication code of the target software stored in the dedicated memory, at a third time point. The electronic device may generate a fourth message authentication code of the target software stored in the dedicated memory, at a fourth time point subsequent to the third time point. The electronic device may determine that the fault (e.g., including a hardware fault) occurs in the dedicated memory, based on that the third message authentication code and the fourth message authentication code are different from each other.

Figure 8:
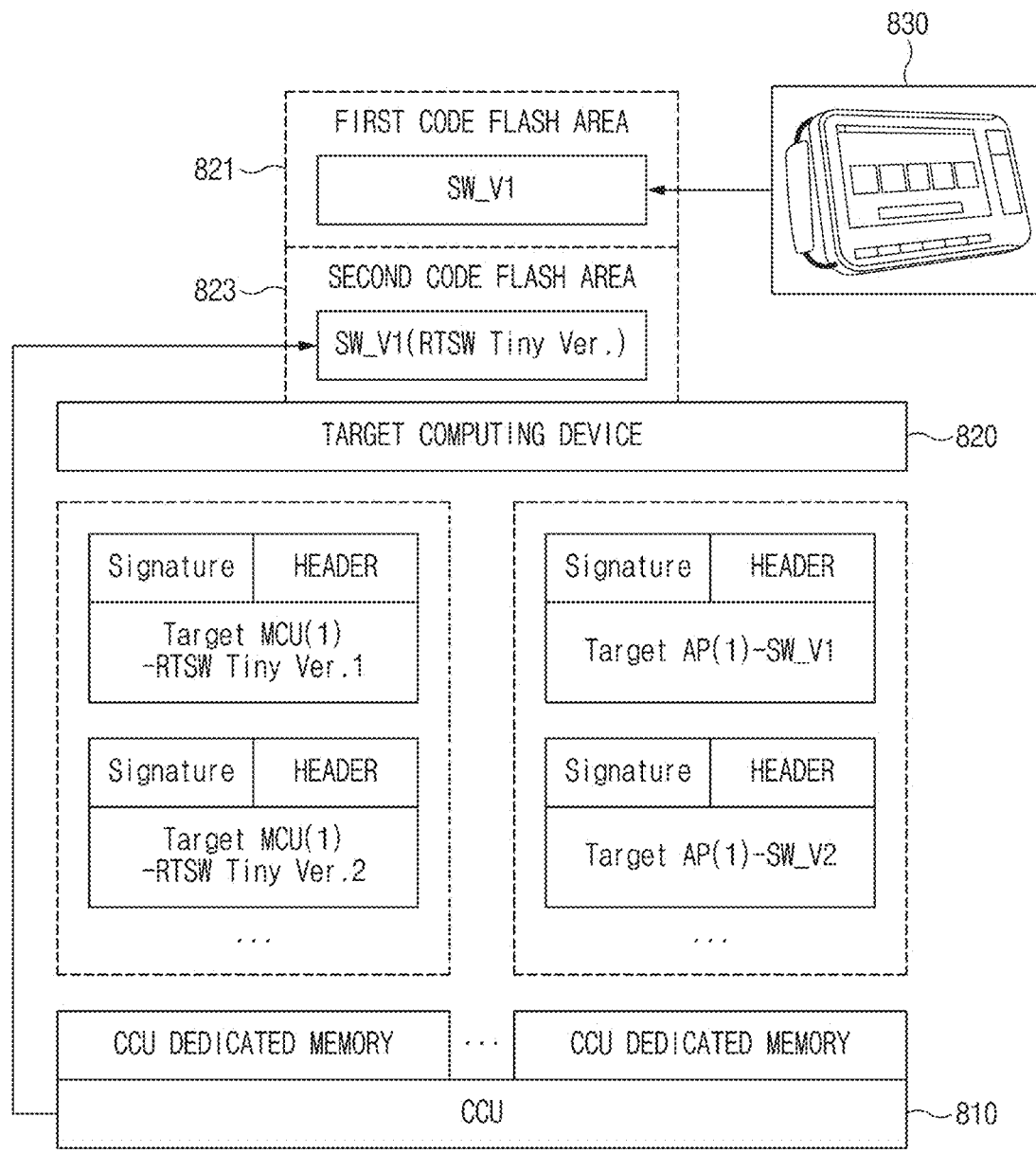
FIG. 8 is a drawing illustrating a method for determining whether a fault occurs in a code flash area, by use of a record of communication between a central communication unit (CCU) and a target computing device, in an electronic device according to an embodiment of the present disclosure.

FIG. 8 is a drawing illustrating a method for determining whether a fault occurs in a code flash area, by use of a record of communication between a central communication unit (CCU) and a target computing device, in an electronic device according to an embodiment of the present disclosure.

An electronic device (e.g., an electronic device 100 of FIG. 1) according to an embodiment may identify a CCU 810 and a target computing device 820. For example, the target computing device 820 may be connected with a diagnostic 830 in a wired or wireless manner. The electronic device may identify a code flash area set in a dedicated memory of the target computing device 820. The code flash area may include a first code flash area 821 and a second code flash area 823. Hereinafter, a description will be given of a method for recovering target software, after a fault occurs in the second code flash area 823, for example.

The electronic device may determine whether a fault occurs in the second code flash area 823, based on that the target software is loaded into the second code flash area 823. The electronic device may change a start address to a main function of target software (e.g., RTSW Tiny Version) that performs a minimum function, which is stored in the second code flash area 823 that may be a flash bootloader (FBL) code flash area, and may initialize the target computing device 820.

The electronic device may load a reduced version (e.g., shown as Target MCU(1)-RTSW Tiny Ver. 1) of the target software identified from the CCU 810 into the second code flash area 823, based on that the fault occurs in the second code flash area 823 and the target computing device 820 is initialized.

Figure 9:
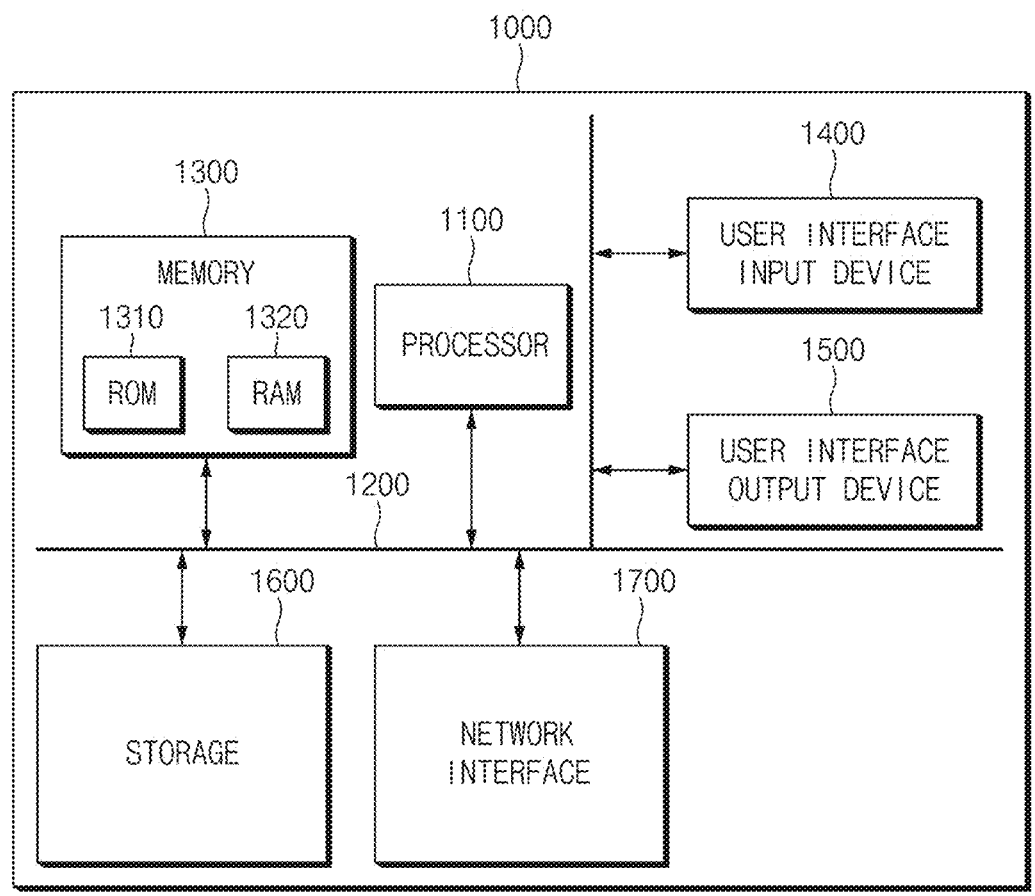
FIG. 9 is a drawing illustrating a computing system associated with an electronic device or a control method thereof according to an embodiment of the present disclosure.

FIG. 9 is a drawing illustrating a example computing system that can be associated with an electronic device or a control method thereof according to an embodiment of the present disclosure.

Referring to FIG. 9, a computing system 1000 about the electronic device or the control method thereof may include at least one processor 1100, a memory 1300, a user interface input device 1400, a user interface output device 1500, storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM, for example.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to some example embodiments and the accompanying drawings, the present disclosure is not necessarily limited thereto, but may be variously modified and altered by those skilled in the art to which the present disclosure pertains without departing from the spirit and scope of the present disclosure claimed in the following claims.

The above-described example embodiments may be implemented with hardware components, software components, and/or a combination of hardware components and software components. For example, the devices, methods, and components described in the example embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond, for example. A processing unit may perform an operating system (OS) or a software application running on the OS. Further, the processing unit may access, store, manipulate, process and generate data in response to execution of software. It can be understood by those skilled in the art that although a single processing unit may be illustrated for convenience of understanding, the processing unit may include a plurality of processing elements and/or a plurality of types of processing elements, together or distributed. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit.

Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to the example embodiments may be implemented in the form of program instructions that may be executed through various computer use and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions can include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the example embodiments are described with reference to restricted drawings, it may be clear to one skilled in the art that the embodiments can be variously changed or modified based on the above description. For example, adequate effects may be achieved even if the foregoing processes and methods are carried out in different order than described above, and/or the aforementioned components, such as systems, structures, devices, or circuits, can be combined or coupled in different forms and modes than as described above or be substituted or switched with other components or equivalents.

A description will be given of advantages of the electronic device and the control method thereof according to some example embodiments of the present disclosure.

According to at least one of the example embodiments of the present disclosure, the electronic device may load target software among a plurality of pieces of software stored in a dedicated memory of a computing device into a shared memory of a hardware security module for verifying the integrity of software, thus managing a memory using the hardware security module by use of a high-capacity shared memory at low cost and securing the stability of controllers with a minimum increase in unit price.

Furthermore, according to at least one of the example embodiments of the present disclosure, the electronic device may set a first sub-area for recovery of target software in the shared memory, thus backing up pieces of real time software (RTSW) of a micro controller unit (MCU) and an application processor (AP) in common.

Furthermore, according to at least one of the example embodiments of the present disclosure, the electronic device may recover target software by use of the first sub-area, based on that a fault occurs in at least one of the dedicated memory in which the target software is stored or the shared memory into which the target software is loaded, or any combination thereof, thus securely downgrading software that is an update target to a previous version, although abnormality occurs in the software due to a memory fault and securing redundancy by use of software of the same version to improve the safety of the controller.

In addition, various advantages ascertained directly or indirectly through the present disclosure may be provided.

Therefore, other implements, other embodiments, and equivalents to claims can be within the scope of the following claims.

Therefore, embodiments of the present disclosure are not intended to necessarily limit the technical spirit of the present disclosure, but are provided for illustrative purposes. The scope of the present disclosure can be construed on the basis of the accompanying claims, and all technical ideas within scopes equivalent to the claims can be included in the scope of the present disclosure.

What is claimed is:

1. An electronic device, comprising:
   one or more processors; and
   storage media storing computer-readable instructions that, when executed by the one or more processors, enable the one or more processors to:
   load a target software among a plurality of pieces of software stored in a dedicated memory of a computing device into a shared memory of a hardware security module (HSM) for verifying software integrity;
   set a first sub-area for recovery of the target software in the shared memory; and
   recover the target software using the first sub-area, in response to a fault occurring in one of or both of the dedicated memory in which the target software is stored and the shared memory into which the target software is loaded,
   wherein the instructions further enable the one or more processors to:
   load the target software stored in the dedicated memory into the first sub-area, in response to the fault occurring in the shared memory;
   identify a target address at which the target software is loaded into the shared memory; and
   load the target software loaded into the first sub-area at the target address to recover the target software.

2. The electronic device of claim 1, wherein the instructions further enable the one or more processors to:
   request the HSM to decrypt the target software loaded into the shared memory, in response to the fault occurring in the dedicated memory; and
   store the target software loaded into the shared memory in the dedicated memory, in response to the target software loaded into the shared memory being decrypted using a seed key of a first encryption algorithm about encryption of the target software loaded into the shared memory, to recover the target software stored in the dedicated memory.

3. The electronic device of claim 1, wherein the instructions further enable the one or more processors to:
   identify a temporary software loaded into the first sub-area at a first time point preceding a second time point when the fault occurs in the shared memory; and
   load the temporary software into the first sub-area from the dedicated memory, based on the target software being recovered.

4. The electronic device of claim 1, wherein the instructions further enable the one or more processors to:
   set a second sub-area in the shared memory, wherein the second sub-area is storing a first message authentication code about verifying software integrity; and
   store a second message authentication code of the target software loaded into the shared memory in the second sub-area.

5. The electronic device of claim 1, wherein the instructions further enable the one or more processors to:
   generate a first message authentication code of the target software loaded into the shared memory at a first time point;
   generate a second message authentication code of the target software loaded into the shared memory at a second time point subsequent to the first time point; and
   determine that the fault occurs in the shared memory, based on the first message authentication code and the second message authentication code being different from each other.

6. The electronic device of claim 1, wherein the instructions further enable the one or more processors to:
   identify a record of communication between a central communication unit for updating the plurality of pieces of software included in the computing device through over-the-air (OTA) and the computing device; and
   determine whether the fault occurs in the dedicated memory based on the record of communication.

7. The electronic device of claim 6, wherein the instructions further enable the one or more processors to:
   identify a source code of the target software stored in the dedicated memory based on the record of communication;
   apply a predetermined key and the source code to a second encryption algorithm to obtain a first representative value of the source code; and
   verify validity of the target software based on a comparison between the first representative value and a second representative value of the target software loaded into a memory of the central communication unit.

8. The electronic device of claim 7, wherein the instructions further enable the one or more processors to:
   load the target software loaded into the central communication unit into the dedicated memory, in response to the first representative value and the second representative value being different from each other;
   generate a third message authentication code of the target software stored in the dedicated memory at a third time point;
   generate a fourth message authentication code of the target software stored in the dedicated memory at a fourth time point subsequent to the third time point; and
   determine that the fault occurs in the dedicated memory based on the third message authentication code and the fourth message authentication code being different from each other.

9. The electronic device of claim 6, wherein the instructions further enable the one or more processors to:
   identify a code flash area set in the dedicated memory;
   determine that the fault occurs in the code flash area based on the target software being loaded into the code flash area; and
   load a reduced version of the target software identified from the central communication unit into the code flash area in response to the fault occurring in the code flash area.

10. A control method, comprising:
    loading a target software among a plurality of pieces of software stored in a dedicated memory of a computing device into a shared memory of a hardware security module (HSM) for verifying software integrity;

setting a first sub-area for recovery of the target software in the shared memory; and recovering the target software using the first sub-area in response to a fault occurring in one of or both of the dedicated memory in which the target software is stored and the shared memory into which the target software is loaded, wherein recovering of the target software comprises:

loading the target software stored in the dedicated memory into the first sub-area, in response to the fault occurring in the shared memory;

identifying a target address at which the target software is loaded into the shared memory; and loading the target software loaded into the first sub-area at the target address to recover the target software.

11. The control method of claim 10, wherein the recovering of the target software includes:

requesting the HSM to decrypt the target software loaded into the shared memory, in response to the fault occurring in the dedicated memory; and storing the target software loaded into the shared memory in the dedicated memory, in response to the target software loaded into the shared memory being decrypted using a seed key of a first encryption algorithm about encryption of the target software loaded into the shared memory, to recover the target software stored in the dedicated memory.

12. The control method of claim 10, wherein the recovering of the target software further includes:

identifying temporary software loaded into the first sub-area at a first time point preceding a second time point when the fault occurs in the shared memory; and loading the temporary software into the first sub-area from the dedicated memory, based on the target software being recovered.

13. The control method of claim 10, further comprising:

setting a second sub-area in the shared memory, wherein the second sub-area is storing a first message authentication code about verifying software integrity; and storing a second message authentication code of the target software loaded into the shared memory in the second sub-area.

14. The control method of claim 10, further comprising:

generating a first message authentication code of the target software loaded into the shared memory at a first time point;

generating a second message authentication code of the target software loaded into the shared memory at a second time point subsequent to the first time point; and determining that the fault occurs in the shared memory in response to the first message authentication code and the second message authentication code being different from each other.

15. The control method of claim 10, further comprising:

identifying a record of communication between a central communication unit for updating the plurality of pieces of software included in the computing device through over-the-air (OTA) and the computing device; and determining whether the fault occurs in the dedicated memory based on the record of communication.

16. The control method of claim 15, wherein the determining of whether the fault occurs in the dedicated memory includes:

identifying a source code of the target software stored in the dedicated memory based on the record of communication;

apply a predetermined key and the source code to a second encryption algorithm to obtain a first representative value of the source code; and verifying validity of the target software based on a comparison between the first representative value and a second representative value of the target software loaded into a memory of the central communication unit.

17. The control method of claim 16, wherein the determining of whether the fault occurs in the dedicated memory further includes:

loading the target software loaded into the central communication unit into the dedicated memory, in response to the first representative value and the second representative value being different from each other;

generating a third message authentication code of the target software stored in the dedicated memory at a third time point;

generating a fourth message authentication code of the target software stored in the dedicated memory at a fourth time point subsequent to the third time point; and determining that the fault occurs in the dedicated memory based on the third message authentication code and the fourth message authentication code being different from each other.

18. The control method of claim 15, further comprising:

identifying a code flash area set in the dedicated memory;

determining that the fault occurs in the code flash area based on the target software being loaded into the code flash area; and loading a reduced version of the target software identified from the central communication unit into the code flash area in response to the fault occurring in the code flash area.

* * * * *